March 21, 1967 R. M. PIERSON ET AL 3,309,861
POLYURETHANE COATED GLASS ROPE
Filed May 14, 1964
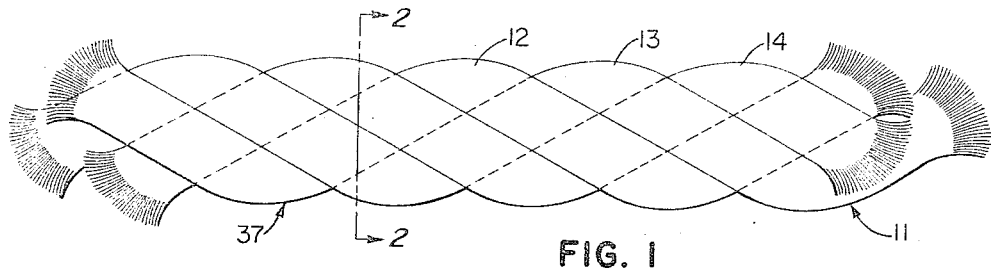
FIG. 1
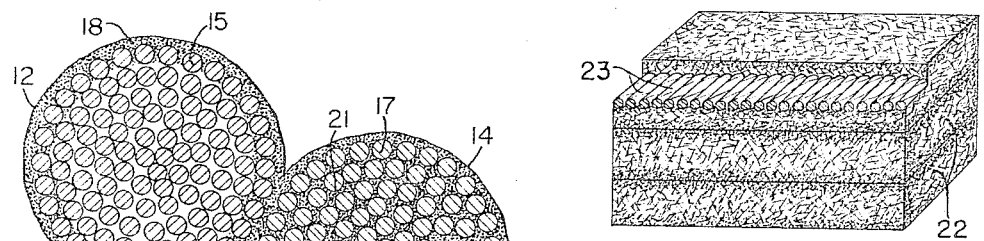
FIG. 2
FIG. 5
FIG. 3
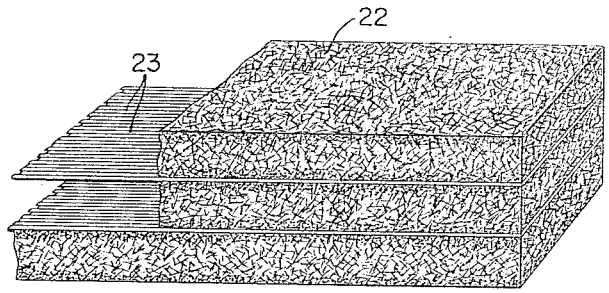
FIG. 4
INVENTOR.
ROBERT M. PIERSON
BY ANTHONY F. FINELLI
J. B. Holden
ATTORNEY 3,309,861
POLYURETHANE COATED GLASS ROPE
Robert M. Pierson, Hudson, and Anthony F. Finelli, Akron, Ohio, assignors to The Goodyear Tire & Rubber Company, Akron, Ohio, a corporation of Ohio
Filed May 14, 1964, Ser. No. 367,406
2 Claims. (Cl. 57—140)

This invention is addressed to the method of applying a polyurethane coating to glass fibers and the products obtained therefrom. More particularly, this invention is addressed to the manufacture of rovings, yarns and fabrics useful as cordage per se and glass fiber in other arrangements such as fiber mats.

It is an object of this invention to produce glass fibers coated with polyurethane and related polyurethane glass composites.

Other objects of the invention may be appreciated upon perusal of the specifications, drawings and claims herein. It has been found that glass fibers coated with polyurethane have improved physical properties and resistance to breaking and other physical properties which result in cordage and other products produced from glass fibers having improved physical properties.

FIG. 1 is a side elevation view of a glass cord containing a polyurethane coating. FIG. 2 is a simplified enlarged transverse sectional view of the cord of FIG. 1 taken along the line 2—2 shown in FIG. 1.

FIG. 3 is an enlarged sectional view in perspective of a glass fiber mat having the fibers arranged in jack straw fashion and containing parallel filament reinforcements. FIG. 4 is a schematic view of the dipping apparatus. FIG. 5 is a sectional view in perspective of a fiber glass composite.

Referring to FIGS. 1 and 2, the cord indicated generally by the numeral 11 is shown which is constructed according to one form of my invention. Cord 11 may consist, for example, of three single strands 12, 13 and 14 which have been twisted together. As may be seen in FIG. 2, the single strands 12, 13 and 14 have an inner core 15, 16 and 17 respectively made of glass yarn, i.e., bundles of glass filament and yarns twisted together. Each of the cores 15, 16 and 17 contains at least an outer covering of cured polyurethane elastomer shown by numerals 18, 19 and 20 respectively, which may be continuous or discontinuous as shown by numerals 18 and 19 respectively. It is also advantageous to have the polyurethane elastomer extend throughout the strand as shown by the numeral 21 of strand 14. It should be appreciated that during the course of making the individual cores it is sometimes desirable to coat each of the glass yarns with a sizing material or a lubricant. Examples of such sizing or lubricant materials are aqueous solutions of materials such as polyvinyl acetate, dextrinized starch and unsaturated organo silicon compounds, epoxy compounds and the usual chrome finish.

From the above description of FIG. 2 it should be apparent that from FIG. 1 the protective layer extends about said rope and between the strands to engage the spiral ridges 37 of said strands to separate the same, one from another, such ridges corresponding in pitch and strand angle to the outer surface of the strands wherein the spiral ridges are peripherally connected by the protective layer.

The polyurethane coating can be applied either to the filament or the commercial yarns, random mat, glass fiber, or twisted cordage by the solution technique, the melt technique or the spray technique. The specific aspects of these techniques may be better understood from the following representative examples of the formulations embodying the features of this invention for treating continuous and staple glass fibers in sliver, roving and yarn formation or the cordage per se.

In the following examples which are illustrative of the present invention, parts and percentages are by weight unless otherwise specifically noted.

EXAMPLE I

*Melt coating*

A polyurethane was prepared by reacting a maximum of 200 parts of an ester, prepared from a mixture of 85% ethylene glycol, 15% glycerol-α-allyl ether with adipic acid, said ester having a reactive number of 62 and an acid number less than about 5, with 30.2 parts of o-tolidine diisocyanate at 70–89° C. for 15 minutes. This material was used to form a molten bath through which glass fiber strands were drawn to be coated with the polyurethane. The strands coated with polyurethane were cured at 105° C. for 20 hours.

EXAMPLE II

*Solution coating*

Part of the melt of Example I was dissolved in sufficient ethyl acetate to give a liquid mixture at room temperature of about 25° C. This liquid mixture was placed in a bath and additional fiber glass strands were dipped therein. The dipped strands were cured at 105° C. for 20 hours. The physical properties of the fiber glass strands coated with polyurethane according to the procedures of Examples I and II are shown in Table 1.

TABLE 1

|  | Break Strength | | |
| --- | --- | --- | --- |
|  | Lbs. | Percent Gain | Rubber Glass Ratio |
| Type Glass Fiber 150—1/0:[1] | | | |
| Uncoated | 2.8 | Frayed | 0 |
| Melt Coated | 4.7 | 69 | 2.6/1 |
| Solution Coated | 4.7 | 68 |  |
| Type Glass Fiber 150—3/2:[2] | | | |
| Uncoated | 12 | Shredded | 0 |
| Melt Coated | 18 | 50 | 1.9/1 |
| Solution Coated | 18 | 50 |  |

[1] 150—1/0 indicates a single strand with negligible twist.
[2] 150—3/2 indicates 3 strands twisted together and doubled.

The strands coated by the melt technique of Example I and the dip technique of this example could be bent easily without kinking or breaking. Also, when the coated glass fiber strands were subjected to tension they gave a clean one-spot break while the uncoated strands failed by fraying along its entire length.

EXAMPLE III

A prepolymer was made by reacting 150 parts of a polyester, made by reacting adipic acid with a mixture of 80 parts ethylene glycol and 20 parts propylene glycol, with 22 parts of the commercial mixture of the isomers of toluene diisocyanate. The prepolymer was mixed with 9.7 parts of molten ortho dichlorobenzidine and the resulting mixture was dissolved in sufficient methyl ethyl ketone to give a 50% by weight solution. This was used to solution dip coat glass fiber strands and the dip coated strands were cured at 105° C. for 16 hours. The Instron tensile at the break point on the coated and uncoated glass fiber strands are shown in Table 2:

TABLE 2

| Type Glass Fiber 150—1/0 | Break Strength, lbs. | Glass Fiber 150—3/2 | Break Strength, lbs. |
|---|---|---|---|
| Uncoated | 2.7 | 1 Strand Uncoated | 12 |
| Coated | 4.7 | Two 150—3/2 Urethane Coated with Slight Helical Twist | 44 |

Glass fibers may be coated by the procedure of Example III where a poly tetramethylene ether glycol of about 3000 molecular weight is substituted for the polyester of Example III.

EXAMPLE IV

A prepolymer was prepared by reacting 21.6 parts of the commercial mixture of the isomers of toluene diisocyanate with 150 parts of a polyester prepared by reacting adipic acid with a mixture of 80 parts ethylene glycol and 20 parts propylene glycol. This prepolymer was mixed with 11 parts isopropylidine bis-(2-chloroaniline) and immediately the mixture was dissolved in sufficient methyl ethyl ketone to give a 40% solution of the polyurethane. This solution was used to dip glass fiber strands and the dipped specimens were cured at 105° C. for 20 hours. The Instron break strength of the coated and uncoated strands are shown in Table 3:

TABLE 3

| Type Glass Fibers 150—3/2 | Break Strength, lbs. | Glass Fibers 150—1/0 | Break Strength, lbs. |
|---|---|---|---|
| Uncoated | 12 | One Strand Uncoated | 2.7 |
| Coated | 28 | Three Coated Strands (slight twist) | 16 |

Several 5 foot lengths of the glass fiber strands of the 150—3/2 type were dip coated with the methyl ethyl ketone solution of the polyurethane reaction mixture of this example. These coated glass fiber strands were cured at 105° C. for 16 hours. The Instron break strength on these 5 foot length glass fiber strands dipped and twisted in the manner indicated is given in Table 4. One of the coated cords formed by twisting 3 dipped strands together as indicated above, was subjected to 2216 flexes on the Olsen fold test (ASTM D–643–43) without the cord breaking. Another 5-foot length of the single strand polyurethane coated fiber glass having a 22 pound Instron break strength was affixed to a V-belt driving 3 shafts and the strand was subjected to 350,000 flexes over a period of 65 hours. At the end of this time the Instron break strength of the strand was unchanged from its original value of 22 pounds.

TABLE 4

Glass fiber specimens: Break strength, lbs.
Uncoated strand _____ 12
One strand coated _____ 22
Two strands coated (slight twist) _____ 44
Three strands coated (twisted, doubled over, and twisted the other way) _____ 98

EXAMPLE V

The methyl ethyl ketone solution of the polyurethane of Example IV was used to dip twenty pieces of 6-foot lengths of 60-end roving glass fiber. The glass fiber was run through the two dip units of FIGURE 4 and then through squeegee rolls to remove the excess liquid. A 125-foot length of a 60-end roving glass fiber was dipped in the methyl ethyl ketone solution of Example IV, then these dipped 60-end roving glass fiber strands were cured at 95° C. for 18 hours. These coated cords contained 38 parts dry rubber per 100 parts of glass.

A cable containing 3 strands of the 60 end roving glass fiber was made by hand braiding these polyurethane coated cords. Another cable was formed by braiding 6 of the twisted triple strands around a center triple strand to give a cable containing 7 of the triple 60-end roving fiber strands.

EXAMPLE VI

A random glass fiber mat polyurethane composite was formed by placing a meltable polyurethane reaction mixture in the uncured state within a mold 6 x 4 x ½ inch. Then a 6 x 4 inch piece of random glass fiber mat with the glass fibers having essentially a jack straw arrangement was placed over the melted polyurethane reaction mixture within the mold. Then the mold was filled with additional amounts of the melted polyurethane reaction mixture. This melted polyurethane reaction mixture was formed by mixing 22 grams of methylene bis-ortho-chloroaniline with 200 parts of a prepolymer of toluene diisocyanate and tetramethylene ether glycol having a molecular weight of about 1400. The mold was placed in a press and press cured for 98 minutes at 130° C. and relatively low pressure. Then it was given an additional cure at 103° C. for 16 hours. The cured polyurethane random glass fiber mat composite had a Shore D hardness of 28.

When the above procedure was repeated, except two layers of the random glass fiber mat was used, the resulting polyurethane composite had a Shore D hardness of 43. The composite mat formed having three layers of the random glass fiber mat had a Shore D hardness of 54 and one containing 4 layers of the random glass fiber mat had a Shore D hardness of 64. Thus, it is possible to change the hardness of the polyurethane glass fiber mat composite by changing the rubber to glass ratio. For example, when the percentage of glass in the composite is 17%, the Shore D hardness is 28; 32% glass in the composite gives a Shore D hardness of 43; and about 50% glass in the composite results in the Shore D hardness of the composite being 50 to 60.

Instead of the random glass fiber mats, chopped glass fiber strands about ¼" or less, glass flock and glass cloth may be coated with polyurethane in accordance with the above procedure to obtain glass polyurethane composites which are relatively flexible or essentially non-flexible, depending upon the ratio of glass to polyurethane. Hence, it is possible by the procedure of this example to obtain glass polyurethane composites which are relatively rigid or relatively flexible in nature. Where the composite is relatively flexible it is possible to take sheets of the composite and bend them to fit various shapes and thereby facilitate forming glass fiber bodies of various shapes and construction. Hence, by varying the percentage of glass in the glass polyurethane composite from about 10 to 85% by weight, it is possible to vary the Shore D hardness of the composite from about 20 to about 80.

EXAMPLE VII

A prepolymer was formed by reacting 250 parts of propylene adipate having a reactive number of 57.3 with 36 parts toluene diisocyanate. This prepolymer was mixed with 18 parts of isopropylidine bis(2-chloroaniline). This melted mixture was poured into a mold 6 x 6 x ½₂ and then a glass mat of the random type shown in FIG. 3 having fibers arranged in a jack straw manner 22 and having continuous parallel fibers 23 as a reinforcement, was placed in the mold and more melt was added to fill the mold. This mixture was press cured for 10 minutes at 110° C. and then further cured at 100° C. for 13 hours. The cured sheet had good flexibility.

EXAMPLE VIII

Glass fiber yarn was dip coated by passing the fiber through one of the dip units 24 and 25 of FIG. 4. The yarn was fed to the unit by passing over rolls 26, 34 and 35 and under rolls 27, 28, 29 and 30. It should be noted that in this example only unit 25 contains the solution for coating the yarn. From unit 25 the yarn passes through squeeze rolls 31 and 32, through a heater 33 before being wound on the drum 36. A 50% solution of a casting melt prepared from a tolylene diisocyanate polyester prepolymer with 4,4'-methylene bis(2-chloroaniline) as the curative, was used in the dip tank. The following table shows the effect of the amount of polyurethane pickup on the break strength of the glass fiber yarn. Also, it indicates the effect of the tension on the glass fiber yarn during the dipping operations.

TABLE 5

|  | Break Strength (lbs.) | Average Diameter (inches) | Rubber Takeup (percent) |
|---|---|---|---|
| 12 End | 33 | | |
| Tension during dip, lbs.: | | | |
| 0.6 | 30.4 | 0.008 | 53 |
| 1.5 | 50 | 0.007 | 29 |
| 3.0 | 51 | 0.008 | 18 |
| 21 End | 53 | | |
| Tension during dip, lbs.: | | | |
| 1.5 | 76 | 0.010 | 19 |
| 3.0 | 84 | 0.010 | 20 |

This technique was used to prepare a dipped and filament wound collapsible pressure bottle (drum). This example indicates the advantages of use of tension coating where the tension is from about 0.25 pound to less than break point of the specimen. Also, better break strength is obtained with smaller amounts of polyurethane where the elongated glass specimen is coated at tensions of about 1.5 to 3.5 pounds.

The polyurethane reaction mixture can be made by reacting about 0.98 to about 2.0 moles of an organic polyisocyanate such as the preferred ones of toluene diisocyanate, tolidine diisocyanate, bis-4,4'-isocyanatophenylmethane (sometimes called MDI) and mixtures of polyisocyanates containing appreciable amounts of MDI, with a reactive hydrogen containing polymeric material of about 700 to 10,000 and preferably 1000 to 4000 molecular weight. These reactive hydrogen containing polymeric materials are illustrated by the classes of polyether polyols or glycols, the polyester polyols or glycols and polyesteramides, including the polyesters and polyesteramides formed by polymerization of the respective lactanes such as epsilon caprolactane or lactams such as epsilon caprolactam, the hydrocarbon polyols and the polycarbamate diols.

The use of crosslinking agents such as the organic diamines, glycols, and amino alcohols, monomeric polyamines and monomeric polyols in amounts sufficient to react with the excess polyisocyanate is desirable to facilitate curing of the polyurethane by enhancing the rate of set. It is desirable to use about 0.2 to 0.9 mol of crosslinker in some cases. Other representative crosslinking agents are methylene dianiline where the polyurethane is applied by spraying, trimethylol propane, triethanolamine, orthodichlorobenzidine, methylene bis-ortho-chloroaniline, and 2-amino-2-methyl propanol.

While certain representative embodiments and details have been shown for the purpose of illustrating the invention, it will be apparent to those skilled in this art that various changes and modifications may be made therein without departing from the spirit or scope of the invention.

What is claimed is:

1. A glass rope comprising outer elements surrounded by an elastic sheathing characterized in that the glass elements of the rope are twisted with narrow gaps between them and in that the material of the elastic sheathing penetrates through these gaps to essentially enclose said glass elements, said elastic sheathing comprising (1) a reactive hydrogen containing polymeric material having a molecular weight of about 700 to 10,000 selected from the group consisting of the polyester polyols, polyether polyols and polyesteramides, (2) an organopolyisocyanate, and (3) a cross-linking agent selected from the class consisting of diamines, amino alcohols and glycols.

2. A glass rope composed of several strands of glass fiber twisted together and a protective layer about said rope and between the strands to engage the spiral ridges of said strands to separate the same, one from another, such ridges corresponding in pitch and strand angle to the outer surface of the strands, wherein the spiral ridges are peripherally connected by the protective layer, said protective layer comprising the reaction product of a liquid reaction mixture comprising (1) a reactive hydrogen containing polymeric material having a molecular weight of about 700 to 10,000 selected from the group consisting of the polyester polyols, polyether polyols and polyesteramides, (2) an organopolyisocyanate, and (3) a cross-linking agent selected from the class consisting of diamines, amino alcohols and glycols.

References Cited by the Examiner

UNITED STATES PATENTS

| 2,369,876 | 2/1945 | Warren | 57—140 X |
| 2,799,598 | 7/1957 | Biefeld et al. | 57—140 X |
| 2,903,779 | 9/1959 | Owens | 57—140 |
| 3,056,691 | 10/1963 | Zartl | 117—126 X |
| 3,188,302 | 6/1965 | Lorenz | 117—126 X |
| 3,245,827 | 4/1966 | Weber | 117—126 X |

FRANK J. COHEN, *Primary Examiner.*

J. PETRAKES, *Assistant Examiner.*